No. 653,056. Patented July 3, 1900.
J. S. BAKER.
CAR BRAKE DEVICE.
(Application filed Nov. 7, 1898. Renewed Mar. 30, 1900.)
(No Model.) 2 Sheets—Sheet 1.
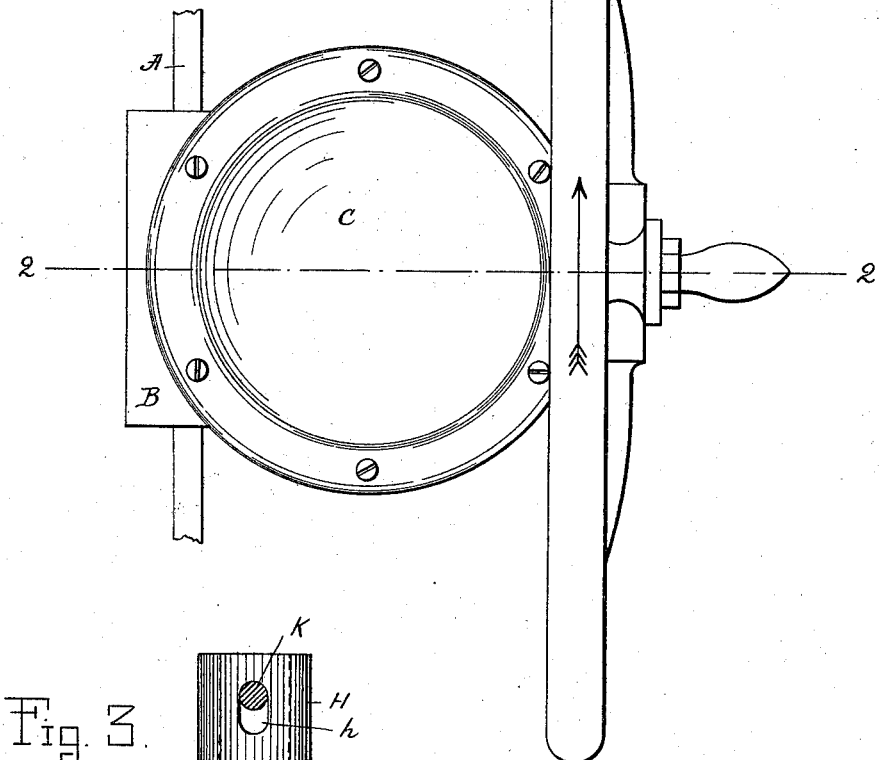
Witnesses
Karl A. Andrén.
William W. Limmis.
Inventor
John S. Baker
by Alban J. Andrén.
his atty.

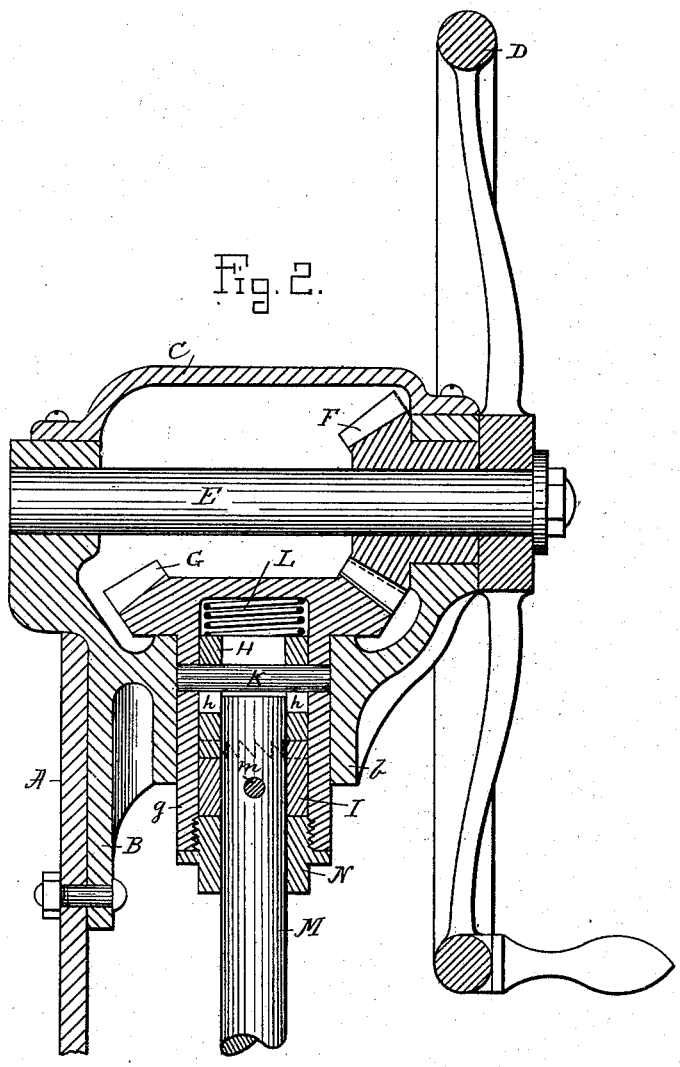

UNITED STATES PATENT OFFICE.

JOHN S. BAKER, OF BEVERLY, MASSACHUSETTS, ASSIGNOR TO THE BEVERLY ENGINE AND MACHINE COMPANY, OF PROVIDENCE, RHODE ISLAND.

CAR-BRAKE DEVICE.

SPECIFICATION forming part of Letters Patent No. 653,056, dated July 3, 1900.

Application filed November 7, 1898. Renewed March 30, 1900. Serial No. 10,848. (No model.)

*To all whom it may concern:*

Be it known that I, JOHN S. BAKER, a citizen of the United States, residing at Beverly, in the county of Essex and State of Massachusetts, have invented new and useful Improvements in Car-Brake Devices, of which the following is a specification.

This invention relates to improvements in car-brake devices for railway-cars, and although specially designed for vestibule-cars it may with equal advantage be used for other kinds of railway-cars, as will hereinafter be more fully shown and described, reference being had to the accompanying drawings, wherein—

Figure 1 represents a top plan view of the invention. Fig. 2 represents a central longitudinal section on the line 2 2 shown in Fig. 1, and Fig. 3 represents a detail side elevation of the toothed clutches.

Similar letters refer to similar parts wherever they occur on the different parts of the drawings.

In the drawings, A represents the dasher end of a car or other suitable support, to which the bracket B is secured in any suitable manner. The said bracket besides serving as a support for the gear mechanism, crank-shaft, and upper part of brake-staff also serves as a box or shell for inclosing the working parts of the device and is closed by means of a cap or cover C, as shown in Figs. 1 and 2, thus preventing dust, dirt, &c., from clogging the gears which form a part of the working mechanism.

D represents a crank or crank-wheel secured to one end of the shaft E, suitably journaled in bearings in the bracket B, and to said shaft is secured a bevel-pinion F, the teeth of which mesh with the teeth of a bevel-gear G, having a sleeve or hollow hub $g$, which is journaled in a bearing $b$, forming a part of the bracket B, as shown in Fig. 2.

Within the hollow hub $g$ of the bevel-gear G are contained two toothed clutches H and I, the upper one, H, being connected to the hollow hub $g$ by means of a pin K, secured to the latter and passing loosely through slots $h\ h$ in said upper clutch. This construction permits said clutch to yield upwardly, preferably against the influence of a spring L, interposed between it and the under side of the gear G, and to be disengaged from the lower clutch I when the crank or crank-wheel D is turned in an opposite direction to that shown by arrow in Fig. 1. The clutch I is secured to the brake-staff M, preferably by means of a pin $m$, as shown in Fig. 2. The brake-staff M is free to turn in a bushing N, which is screwed into the lower end of the sleeve-hub $g$, and said bushing serving as a check-nut for preventing the sleeve $g$ and its gear G from moving upward when the crank-wheel D is turned in an opposite direction to that in which it is turned for setting the brake.

The brake-beams and shoes are connected in a suitable manner to the lower end of the brake-staff M; but as such connecting mechanism is well known in devices of this kind it is not represented in the drawings.

The operation is as follows: Normally the clutch H is held interlocked with the clutch I by the spring L or by gravity, as shown in Figs. 1 and 3. In setting the brake the operator first turns the wheel or crank D to the right in the direction of arrow shown in Fig. 1, causing the beveled pinion F to be correspondingly rotated and through said pinion causing a rotary motion to be imparted to the gear G, the interlocked clutches H I, and the brake-staff M. After the slack of the brake has thus been taken up the operator continues to set the brake by rocking the hand wheel or crank D, thus alternately releasing the clutch H from the clutch I and interlocking the same until the desired frictional pressure on the brake is obtained.

During the setting of the brake the brake-staff is held in position preferably by means of the usual ratchet-and-pawl mechanism common in brake devices.

Having thus fully described the nature, construction, and operation of my invention, I wish to secure by Letters Patent and claim—

In brake-operating mechanism, the combination with a bracket secured to a stationary part of a vehicle, and provided with vertical and horizontal bearings, of a shaft rotatably mounted in the horizontal bearings of said bracket and provided with operating means a pinion fixed to said shaft, a sleeve rotatably mounted in the vertical bearings of said bracket, a gear-wheel on said sleeve meshing with said pinion, a brake-staff extending into said sleeve, a clutch interposed between said staff and sleeve, one of the members of which is secured to said staff, and the other is provided with elongated slots, and a pin secured to said sleeve and extending transversely therethrough and through said slots, as and for the purpose set forth.

In testimony whereof I have hereunto set my hand in presence of two subscribing witnesses.

JOHN S. BAKER.

Witnesses:
ALBAN ANDRÉN,
KARL A. ANDRÉN.